3,397,159
AQUEOUS SOLUTIONS OF SALTS OF 1,4-BIS(2-HYDROXYPROPYL)-2-METHYL PIPERAZINE AND EPOXY ESTER-MALEIC ANHYDRIDE ADDUCTS
William W. Slater and Lawrence E. Thow, Louisville, Ky., assignors, by mesne assignments, to Celanese Coatings Company, a corporation of Delaware
No Drawing. Filed Feb. 18, 1964, Ser. No. 345,564
13 Claims. (Cl. 260—18)

ABSTRACT OF THE DISCLOSURE

Aqueous coating compositions particularly useful in electrophoretic coating processes are made from aqueous solutions of the salts of (1) 1,4-bis(2-hydroxypropyl)-2-methylpiperazine and (2) maleic anhydride adducts of unsaturated fatty acid esters of glycidyl ethers of dihydric phenols.

---

This invention relates to aqueous coating compositions and more particularly to a water-soluble amine salt of epoxy ester maleic anhydride condensation products. The invention includes electrophoretic coating compositions as well as a process of electrophoretic coating.

The new amine salts of this invention are 1,4-bis(2-hydroxypropyl)-2-methylpiperazine amine salts of epoxide ester maleic anhydride condensates. The new amine salts can be used to form coating compositions and can readily be coated to the desired substrate from solutions by conventional coating techniques, such as brushing, spraying, roller coating, and so forth. The new amine salts are particularly useful in water-reduced forms as aqueous coating compositions and particularly as electrophoretic coating compositions. The coatings formed according to this invention can be cured to the insoluble infusible state by heat alone.

The 1,4-bis(2-hydroxypropyl) - 2 - methylpiperazine epoxide ester maleic anhydride salts of this invention are prepared by first reacting an epoxide resin with an unsaturated fatty acid in sufficient proportions to react with substantially all of the hydroxyl groups or hydroxy functional groups (1 epoxide group is considered equivalent to 2 hydroxyl groups) contained in the epoxide resin under esterification conditions to form the fatty acid ester of the epoxide resin. The ester of the epoxide resin is then reacted with maleic anhydride to form the epoxide ester maleic anhydride condensate. The condensate is then reacted with 1,4-bis(2-hydroxypropyl) - 2-methylpiperazine to form the corresponding amine salt.

The epoxide resins which can be used to form the fatty acid epoxide resin esters and subsequently the maleic anhydride condensates are low melocular weight glycidyl ethers of dihydric phenols. Although fatty acid esters of high molecular weight glycidyl ethers of dihydric phenols can be prepared, these higher molecular weight esters tend to gel during the reaction with maleic anhydride. Therefore, the glycidyl ethers of dihydric phenols which are to be used according to this invention are preferably selected on the basis of their molecular weights so that subsequent reaction of the esters with maleic anhydride will not result in gel formation. The particular molecular weight will also depend somewhat upon the hydroxyl functionality of the glycidyl ether, and it is thus difficult to place any approximate upper limit on the molecular weight of the glycidyl ethers which can be used. The exact molecular weight of the glycidyl ethers which can be used under any particular circumstance can be determined by those skilled in the art by routine experimentation. Experiments to date have indicated that glycidyl ethers of dihydric phenols having an average molecular weight of less than about 700 can generally be employed in practicing the present invention without encountering gelation during the maleic anhydride condensation reaction.

The most advantageous epoxide resin which can be used according to this invention is the diglycidyl ether of bisphenol. The diglycidyl ether of bisphenol A has an epoxide equivalent weight of about 190 and a melting point of about 8° C. The diglycidyl ether of bisphenol can be prepared by known procedures by reacting, for example, 10 mols of epichlorohydrin with 1 mol of bisphenol using 2 mols of caustic. It is preferred to utilize bisphenol A in the preparation of the diglycidyl ether having the following formula in which R and R' are methyl radicals.

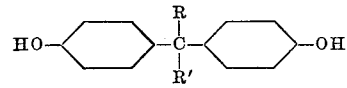

Other bisphenols can also be used to form the diglycidyl ethers of bisphenol in which R and R₁ are hydrogen or lower alkyl radicals containing, for example, 2 to 5 carbon atoms. Other types of bisphenols might also be used, as will be apparent to those skilled in the art.

Mixtures of glycidyl ethers of dihydric phenols can also be advantageously used according to this invention so long as the average molecular weight of the mixture is sufficiently low to prevent gelation when the fatty acid esters thereof are reacted with maleic anhydride. Experiments, so far, have also indicated that the average molecular weight of such mixtures should be below about 700 in order to be assured that no gelation will occur during the reaction of maleic anhydride with the fatty acid ester.

An example of a higher molecular weight glycidyl ether which can be used in admixture with lower molecular weight glycidyl ethers is the reaction product of 1.57 mols of epichlorohydrin and 1 mol of bisphenol A with excess caustic (about 1.8 mols). The diglycidyl ether so formed has a weight per epoxide of approximately 500. This epoxide resin which will hereinafter be referred to as epoxide resin B can be advantageously employed in admixture with the diglycidyl ether of bisphenol A to at least about 60% by weight of the total epoxide resin mixture.

The unsaturated fatty acids which can be used in the preparation of the fatty acid epoxide resin esters are unsaturated fatty acids having from about 11 to 24 carbon atoms. Such unsaturated fatty acids are normally obtained from drying oils, but, of course, can be obtained from any source desired. Examples of fatty acids which can be used include linoleic, oleic, linolenic, dehydrated ricinoleic, and so forth. Unsaturated fatty acids derived from linseed oil are preferred. Other fatty acids derived from drying and semi-drying oils can also be used according to this invention as will be apparent to those skilled in the art.

The incorporation by esterification of unsaturated fatty acid should provide a sufficient number of ethylene linkages in the ester for subsequent reaction with maleic anhydride and at the same time retain a sufficient number of ethylene linkages to permit the condensate to be cured by heat.

The amount of fatty acid used to esterify the epoxide resin should be substantially equivalent to the hydroxyl functionality of the epoxide resin or slight excess thereof and the water of esterification removed continuously during the reaction to insure substantially complete reaction of the hydroxyl functionality. In determining the hydroxyl functionality of the epoxide resin, one epoxide group is considered equivalent to two hydroxyl groups. The presence of excess hydroxyl functionality in the fatty acid esters of the epoxide resin may result in esterification with maleic anhydride and thus reduce the carboxyl content of the resulting condensate or adduct or lead to gelation. If the hydroxyl functionality of the fatty acid ester of the epoxide resin is too great, it may not be possible to incorporate into the final condensate sufficient free carboxyl groups to react with an amine to form a soluble amine salt. The exact amount of hydroxyl functionality which can be tolerated in the fatty acid esters of the epoxide resins will thus, of course, vary as will be appreciated by those skilled in the art depending upon the particular epoxide resins used, the particular fatty acid with which the epoxide resin is esterified, as well as the reaction conditions. Generally, it is desirable to esterify substantially all of the hydroxyl functionality, that is, around 90%, to insure the presence of sufficient free carboxyl groups in the condensate or the adduct, and to prevent gelation during the maleic anhydride reaction.

It is thus advantageous to esterify the epoxide resin with an amount of fatty acid which is equivalent to the hydroxyl functionality of the epoxide resin and to continue the esterification reaction with the aid of heat with removal of water of esterification until the acid value drops to about 15 or below, preferably below about 10. The esterification reaction can be carried out according to standard esterification procedures with or without solvents, using atmospheric, sub-atmospheric or super-atmospheric pressures. The most advantageous esterification reaction conditions will depend upon the particular reactants involved as well as the presence or absence of esterification catalysts. The esterification reaction temperature will generally be within the range of 400 to 500° F., but can be varied quite widely as is readily apparent to anyone skilled in the art.

The epoxide resins can be modified with various compositions prior to esterification with the fatty acid to alter the property of the condensate as well as the films formed therefrom. Monohydric phenols, for example, can be reacted with the epoxide resins to produce an epoxide resin of lower hydroxyl functionality if lower hydroxyl functionality is desired. The amount of monohydric phenol which can be used to modify the epoxide resins will vary from a fairly small amount up to 1 mol of phenol for each epoxide group.

The epoxide resins can also be esterified with mixtures of saturated acids and unsaturated fatty acids so long as the percentage of unsaturated fatty acids is maintained at a sufficiently high level to insure the presence of residual fatty acid unsaturation in a resulting condensate after reaction with maleic anhydride. Examples of saturated acids which can be used in admixture with the unsaturated fatty acids include benzoic acid, acetic acid, butyric acid, hexanoic acid, stearic acid, and so forth. The amount of saturated acid which can be used will depend somewhat upon the degree of unsaturation of the fatty acid which is used in admixture therewith, but generally saturated acids can be used up to about 50% on a mol basis. If the degree of unsaturation of the fatty acids used is very low, the percentage of saturated acid which could be used in connection therewith will, of course, correspondingly decrease. The exact percentage of saturated acids which can be used under any particular set of circumstances can readily be determined by routine experimentation.

The adduction or condensation reaction of the fatty acid ester of the epoxide resins with maleic anhydride can be carried out by simply mixing the fatty acid epoxide resin ester with the appropriate amount of maleic anhydride and heating the reactants until the reaction has been completed to the desired extent. Substantially complete condensation or adduction of the maleic anhydride with the fatty acid epoxide resin ester is generally desirable and the completeness of the reaction can be determined by a permanganate test. The test consists of extracting a portion of the fatty acid epoxy resin adduct or condensate with an equal portion of water and adding to 2 cc. of the water extract a few drops of 0.05 N potassium permanganate solution. If the extract is pink after 1–3 drops of permanganate solution, no unreacted maleic anhydride remains. The formation of a brown color indicates the presence of unreacted maleic anhydride and in which case, the reaction can be continued if complete reaction is desired or necessary.

The most advantageous adduction or condensation reaction temperature will vary depending upon the particular fatty acid epoxide resin ester being used. In most cases, the preferred reaction temperature is around 360° F. to 380° F. although both higher and lower temperatures could be used. The use of excessively high temperatures should be avoided since gelation of the reaction product is likely to occur. Temperatures in the range of 300° F. and below could, of course, be used as will be appreciated by those skilled in the art but the reaction rate will generally be slower. The addition of various modifiers such as the drying oils and hydrocarbon resins hereinafter discussed to the fatty acid epoxide resin maleic anhydride reaction will also have an effect on the reaction temperatures which should be used. In some instances, the incorporation of such modifiers into the adduction or condensation reaction will permit the use of higher temperatures without fear of gelation.

The amount of maleic anhydride which can be added or condensed with the fatty acid epoxide resin ester can be varied in fairly wide limits depending mainly upon the ultimate use of the condensate or adduct and particularly upon the degree of water-solubility desired of the amine salts. Generally, the use of about 5% by weight of maleic anhydride based on the weight of the total reaction mixture will be required to achieve the presence of sufficient free carboxyl groups in the product to render the amine salts water-soluble. The maximum amount of maleic anhydride which can be used will depend somewhat upon the amount of unsaturation present in the fatty acid epoxide resin ester. A sufficient amount of unsaturation should be retained in the resulting adduct or condensate to permit cross-linking and curing of the compositions through residual fatty acid unsaturation. Generally, about 20% by weight maleic anhydride based on the total weight of the reactants will be the maximum that can be used.

The reaction which occurs between the maleic anhydride and the ester of the epoxide resin is an addition reaction, the type of addition depending upon whether the double bonds of the ester are conjugated or not, as well as the reaction conditions employed. The overall reaction is a condensation of the fatty acid and the epoxide resin, and an addition of maleic anhydride to the epoxide resin ester. For the purposes of this description, however, the reaction will be referred to as a condensation reaction and the product as a condensate.

The fatty acid epoxide resins or condensates can be modified by incorporating in the adduction or condensation reaction various modifying agents such as drying oils, semidrying oils, unsaturated hydrocarbon resins and copolymers thereof. Examples of drying oils or semi-drying oils which can be used to modify the condensates of the fatty acid epoxide resins include soya bean oil, linseed oil, tall oil, dehydrated castor oil, sunflower oil, and safflower oil, and so forth. The amount of drying oil modification which can be employed in the fatty acid epoxide resin condensates should, of course, be limited to an amount which will not interfere with the desirable properties of the condensate including its stability, the resulting film properties and the water-solubility of the amine salts. Generally, such drying oils can be used to modify the condensates up to about 30% by weight of the total composition. The use of drying oils is advantageous to reduce the cost of the condensate and to reduce the overall functionality thereof. The drying oil modification can also be used advantageously to lower the viscosity and facilitate the handling of the unsolubilized fatty acid epoxide resin ester condensates where this is desirable or necessary.

The unsaturated hydrocarbon resins which can be used to modify the fatty acid epoxide resin ester condensates include polymerized fractions of coal tar distllates containing coumarone or indene or petroleum distillates containing cylopentadiene or piperylene. Copolymers of the fractions or distillates with vinyl monomers such as ethylene, isobutylene, styrene, and so forth, can also be used to modify the fatty acid epoxide resin ester condensates. These resins generally have softening points below about 250° F. and iodine values in the range of 100 to 300. The use of such unsaturated hydrocarbon resins to modify the fatty acid epoxide resin ester condensates results in harder films after curing to the insoluble infusible state and can advantageously be employed according to this invention where such harder films are desired. The amount of such unsaturated hydrocarbon resins which can be used can be varied quite widely depending mainly upon the hardness desired in the resultant films. Generally, amounts up to 25% by weight based on the total reactants, can advantageously be used without interfering with the other valuable properties of the condensates.

The amount of 1,4-bis(2-hydroxy propyl)-2-methylpiperazine required to react with the carboxyl groups of the condensate in order to render the condensate water-soluble or water-reducible would depend to some extent upon the particular fatty acid epoxide resin condensate being reacted. Generally, the fatty acid epoxide resin ester condensates can be rendered soluble in water or water-reducible by reacting to condensate with between about 0.5 to 1.5 equivalents of the amine for each carboxyl group of the condensate. The amine equivalent is based upon the amino nitrogen and the acid groups upon the acid value of the condensate.

The amine salts of the fatty acid epoxide resin ester condensates are advantageously formed by placing or dissolving the amine in water and then slowly adding the condensate, but the condensate and amine can be added to the water simultaneously. It is preferred to conduct the condensate amine reaction in the presence of heat. The condensate can first be heated to render it more flowable, to permit easier handling and the use of heat during reaction also facilitates the reaction between the amine and the condensate to produce the water-soluble amine salt. If desired, a small amount of water-insoluble solvents can be added to the condensate before adding the same to water containing the amine to render the condensate more fluid and to facilitate the reaction. Aromatic and aliphatic hydrocarbons as well as certain esters and ketones can be used for this purpose.

The coating compositions of this invention containing the amine salts can be applied to a substrate by conventional procedures alone or in combination with modifying material such as other resins and pigments.

Various pigments can be used and added to the condensate amine salts or solutions thereof according to this invention as will be apparent to those skilled in the art. When the condensate amine salt solutions are to be used as a primer, it is advantageous to incorporate therein red iron oxide pigments although other pigments can be used including magnesium silicate, basic lead silica chromate, lead oxide, silica, chromic oxide, clay, talc, barytes, carbon black, titanium dioxide, and so forth.

Other water-soluble resins, particularly film-forming resins can be incorporated into the water solutions or dispersions of the condensate amine salts to modify the property of the coatings produced therewith, if desired. Water-soluble aminoplast resins such as methylated methylol melamine have been found to be particularly advantageous and can be easily blended with the condensate amine solutions and cured. The incorporation of water-soluble aminoplast resins generally results in improved coating hardness as well as improved solvent, alkali, and salt resistance. Various amounts of such aminoplast resins can be used depending upon the type of coating desired. For example, up to 30 parts by weight based upon the weight of the condensate amine salt can be used in admixture therewith.

Solutions of the amine salts of this invention can be prepared and coated on a substrate containing various percent solids. Generally, solutions containing between 25 and 50 percent solids are advisable and when these are applied to an appropriate substrate, they can be cured by simply heating the coatings to between about 300 to 400 F. for between about 15 and 45 minutes. Driers can be used to obtain cures of the coatings, but they are not necessary. When the solutions are to be used in the electrophoretic process, dilute solutions can be used, as low as 1 to 2 percent solids by weight. Generally, the percent solids in the coating compositions will be in the range of 2 to 20 percent, preferably 4 to 12 percent.

1,4-bis(2-hydroxy propyl)-2-methylpiperazine contains two hydroxyl groups and when films are formed with this amine salt of the maleic anhydride condensates of fatty acid esters of glycidyl ethers of dihydric phenols, it is either removed from the film by volatilization or reacted with the condensate through the two hydroxyl groups and thus further serving to cross-link the resin. This additional cross-linking in the film further improves the corrosion resistance of the film.

When the 1,4-bis(2-hydroxy propyl)-2-methylpiperazine salts are used to form coatings by the electrophoretic process, the condensate is deposited on the anode and the amine is discharged at the cathode and goes back into the solution. A small amount of the amine, however, is carried by the resin to the anode and becomes trapped in the film. This small amount of the amine is also volatilized or caused to react with the condensate or to cross-link therewith during the curing.

As previously noted, the 1,4-bis(2-hydroxy propyl)-2-methylpiperazine salts of the condensate are particularly useful for coating articles having a conductive surface by the electrophoretic process and has many advantages when so used.

It is preferred to continuously operate electrophoretic coating baths by continuously or periodically replenishing the coating resin solids composition in the bath as it is used up during the coating operation. When operating the electrophoretic process continuously, the resin is subjected to heat (around 75° F. to 110° F.) as well as to an electrical field. Under these conditions, the resins generally break down prohibiting more than a few turnovers under continuous operation. The breaking down of the resin requires that the bath be thrown away and a new bath prepared. Aqueous solutions of the 1,4-bis-2-hydroxy propyl-2-methylpiperazine salts of the maleic anhydride condensates of this invention have a very long and useful life when used in the electrophoretic coating process and no breakdown of the resin was observed, even after twenty turnovers. In fact, the number of turnovers to which the amine salts of this invention can be subjected to is in excess of 20 and no maximum number of turnovers has yet been found. One turnover is defined as being the point at which the total added solids is equal to the weight of the original bath solids where the resin is considered as part of the solids.

The fact that the amine salt solutions of this invention are stable at elevated temperatures (around 105 F. to 110 F.) also reduces the necessity and costly step of cooling the bath during the electrophoretic process.

The amine salt resin solutions of this invention when used as an electrophoretic bath have good "throwing power." The term "throwing power" means the ability of the resin to cover areas of the anode article not readily accessible such as parts not facing the cathode directly. This would include the surface of the anode itself, not facing the cathode as well as recessed areas, small blemishes or imperfections.

In carrying out electrophoretic plating processes, the voltages and currents used will be varied depending upon the desired film thickness of the coating and the duration of the plating operation. Increasing the voltage increases the amount of resin composition plated out in a given period of time. The amine resin electrophoretic baths of this invention are very stable and exhibit no break-down or degradation under widely varying electrical potentials. Thus, the amine salt resin solutions of this invention can be used in many types of electrocoating operations, wherein such variables as voltages and currents, duration of the coating operation and coating thickness are important.

Coatings or films, coated electrophoretically or otherwise, according to this invention, have excellent flexibility and adhesion as well as good salt spray resistance and resistance to boiling water and solvents.

One of the main areas of utility for the amine salts and solutions of this invention at the present time is in a primer paint for automobiles and appliances. The condensate amine salts and solutions, however, can also be used to form decorative or protective top coatings.

The continuous operation of electrophoretic coating baths results in a depletion of the resin as well as the pigment solids due to the plating out of the solids on the anode article being coated. The bath, however, can be continuously or intermittently replenished both with resin solids and pigment solids to maintain a fairly constant percent solids in the bath at the desired level and to maintain the pH of the bath at an optimum level. In the electrophoretic coating process, the desired pH level has been considered to be between about 7 and 8.5.

The fact that some of the 1,4-bis(2-hydroxy propyl)-2-methylpiperazine is not volatilized off during the process or deposited on the anode article being coated but remains in solution results in an increase of the pH of the bath, but this can be controlled by adding additional maleic anhydride condensate of fatty acid esters of the epoxide resins to react with the amine placed into solution as a result of the operation of the cell. In order to maintain the desired solids content of the bath as well as the desired ratio of the condensate to the amine to insure complete solubilization of the condensate, a small amount of additional amine should be added to the bath to make up for that loss by being deposited on the anode article or by volatilization.

The term "water-soluble" as used herein is meant to include amine salts of the condensate which are water-reducible by actually dissolving the salt in water, by a simple dispersion of the salt in water or a combination thereof.

The fatty acid epoxide resin ester maleic anhydride condensation products can be treated with water or alcohol before reaction with the amines to effect solubilization to open up the anhydride rings if desired. This step is not necessary, however, to obtain water-soluble compositions according to this invention, but the step is of advantage with some condensation products containing less than about 15 percent by weight maleic anhydride.

The following examples serve to further illustrate the invention and describe in detail how the invention can best be practiced. Epoxide Resin A referred to in the following examples is the diglycidyl ether of bisphenol A. Parts are by weight.

EXAMPLE I

To a suitable container equipped with a mechanical stirrer, Dean-Stark azeotropic distillation apparatus and a temperature recording device, 4568 parts of linseed fatty acids were added. Agitation was begun and heat was applied, raising the temperature to 212° F. Sodium benzoate esterification catalyst (1.63 parts) was added and thoroughly dispersed in the fatty acids. 1632 parts of Epoxide Resin A were then added to the reaction flask and heating was continued, raising the temperature to 500° F. The temperature was held at 490° F. to 500° F. until the acid value of the reactants was 10, a period of 7 hours. Cooling was applied to the reaction container, lowering the temperature of the reactants to 275° F.

Maleic anhydride, 761 parts, was then added to the reactants, the temperature raised to 370° F., and was held at 360° F. to 375° F. for 8 hours. After this time, a negative permanganate test was obtained indicating complete condensation of the maleic anhydride.

The temperature of the reactants was lowered to 170° F. and 282 parts of water, plus 0.87 part of triethylamine added to the reaction vessel. The temperature was slowly raised to 190° F. and held at 190° F. to 195° F. for four hours. After this heating period, the acid value had leveled off at 100 indicating complete hydrolysis of the anhydride groups.

To a paint grinding mill (Baker-Perkins) were added 13.21 parts of the hydrolyzed epoxide ester condensate produced above, 3.50 parts of red iron oxide, 4.25 parts of magnesium silicate, and 3.50 parts of basic lead silicochromate. After grinding these components for 40 minutes, 20.54 additional parts of the hydrolyzed epoxide ester condensate produced above were added to the mill to form an insolubilized pigmented resin. The temperature of the mill was raised to 160° F. to 170° F. Demineralized water, 7.96 parts, was added and thoroughly dispersed in the grind. The resulting hot paste of pigment, resin, and water was then added, while stirring, to a solution of 6.48 parts of 1,4-bis(2-hydroxy propyl)-2-methylpiperazine and 40.56 parts of demineralized water heated to 160° F. Agitation was continued after the addition until a good aqueous dispersion was obtained completing the formation of the primer paint composition.

The resulting pigmented composition was reduced to 10 percent solids with demineralized water and was placed in an electrolytic cell and used as a coating bath. A cold-rolled steel panel (4" x 12") coated with zinc phosphate was used as the anode of the cell and a negative charge was applied to another electrode also immersed in the bath. A potential difference between the electrode and the steel panels was maintained at 350 volts for one minute. Under the influence of the electric potential a film was plated out on the steel anode panel. The panel was removed after one minute. The amperage of the system at the beginning was 2.6 amps, and at the end of one minute 0.9 amp. The film was cured by baking at 385° F. for fifteen minutes. A good, oven-cured film was obtained having a thickness of between about 0.5 and 0.6 mils. The film had a pencil hardness of H.

Another portion of the aqueous resin dispersion produced according to this example was aged at 125° F. for sixteen days and the aged dispersion again used to plate steel panels by the electrophoretic process using a voltage of 200. The steel panels were retained in the cell for one minute. The amperage at the beginning of the plating operation was 2.6 amps and at the end of the operation 1.0 amps. The films were cured by baking at 385° for 15 minutes. Good, even films were obtained with the aged dispersion and the film thickness was determined to be about 0.9 mils.

The cured films prepared in accordance with this example were tested for salt spray resistance using a standard salt spray test, 288 hours, 5% salt (NaCl) in water, using the continuous fog-type spray at 95° F. The panels were scribed down to the bare metal and the resistance was determined by overall appearance and by rust creepage at the scribe. The salt spray results showed the coating to have a rating of 8, 10 being perfect, creepage at the scribe between 0–1/16 of an inch, and a pencil hardness of H.

EXAMPLE II 4400 parts of hydrolyzed epoxide ester condensate produced according to Example I, 1236 parts of basic lead silica chromate, 1236 parts of red iron oxide, and 1534 parts of magnesium silicate were ground in a paint grinding mill for 1 hour. To the grind 7424 additional parts of the hydrolyzed epoxide ester condensate and 86 parts of "Armowax," marketed by Armour & Co. (the reaction product of 2 mols of stearylamide and 1 mol of formaldehyde), were added, and grinding continued for 1 hour.

The pigment-resin mixture, 6,963 parts, was heated to 190° F. and was slowly added, with stirring, to 1,026 parts of 1,4-bis(2-hydroxy propyl)-2-methylpiperazine and 6,719 parts of distilled water heated to 160° F. The resulting aqueous paint had a pH of 7.6 and a weight per gallon of 9.39.

The aqueous paint solution was then further reduced to 10 percent solids with distilled water. The 10 percent solution was then placed in an electrolytic cell and coated on steel anode panels by conventional electrophoretic process using 300 volts. The steel panels were immersed under the influence of an electric field for one minute, removed from the cell and cured. After one minute, the film thickness was 0.8 mil. The initial current density (amperes per square foot of film surface) was 6.45, and the final, 1.11. The throwing power was determined to be 86%.

The films on the steel panels were then baked for 15 minutes at 385° F. The films had a pencil hardness of 2B and good solvent resistance to xylol, ethylene glycol monoethyl ether acetate, and ammonia water.

EXAMPLE III

To a suitable reaction vessel equipped with a thermometer, mechanical stirrer, and Dean-Stark azeotropic distillation apparatus, 2210 parts of linseed oil fatty acids were added. Heat was applied and when the temperature of the acid reached 210° F., 0.8 parts of sodium benzoate esterification catalyst was added to the vessel. After the catalyst was uniformly dispersed in the acid, 790 parts of Epoxide Resin A were added to the flask. The temperature of the reactants was raised to 490° F. and held at 490° F. to 500° F. for 5.5 hours, at which time the acid value of the reactants was determined as 12.4. 60 parts of water were removed during the esterification reaction. The resulting epoxy ester had a Gardner-Holdt viscosity of V to W, a weight per gallon of 8.15, and a Gardner color of 7.

A suitable reaction vessel equipped with a thermometer, mechanical stirrer, and reflux condenser was charged with 2640 parts of the epoxy ester prepared above, and 360 parts of maleic anhydride. Heat was applied to the reactants raising the temperature over a period of two hours and forty-five minutes to 360° F. The temperature was held at 360° F. to 370° F. for seven hours. At the end of this time, the permanganate test described above showed no free maleic anhydride indicating complete adduction or condensation of the anhydride to the epoxy ester.

The anhydride groups of the condensate were then hydrolyzed by adding 110 parts of water and 0.4 parts of triethylamine to a reaction vessel. The reactants were heated at 190° F. to 200° F. for three hours, at which time the acid value had leveled off at 101. The viscous hydrolyzed product had a weight per gallon of 8.6 and a Gardner color of 13. The product exhibited no gelling tendencies after 50 days at room temperature and at 140° F.

An aqueous solution of the above resin condensate was prepared by adding the condensate preheated to 190° F. to an aqueous solution of 1,4-bis(2-hydroxy propyl)-2-methylpiperazine and containing one equivalent of amine for each carboxyl group of the condensate. The solution was then diluted with demineralized water to form a 10 percent solids solution.

The 10 percent solids solution was used as an electrophoretic bath for electrocoating steel panels by the standard electrophoretic process. The steel panels were made the anode and the following electrical and physical properties were determined (4" x 12" steel panels).

| Days Aging a | Volts | Amps | | Throwing Power, Percent throw | Film Thickness | pH of Bath | Type of Film |
|---|---|---|---|---|---|---|---|
| | | Initial | After 1 Min. | | | | |
| 0 | 250 | 1.7 | .3 | 100 | .9 | 8.0 | Smooth, continuous film. |
| 2 days | 250 | 1.7 | .3 | 95 | .9 | 7.8 | Do. |
| 5 days | 250 | 1.7 | .4 | 95 | .8–.9 | 8.0 | Do. |
| 12 days | 250 | 1.8 | .8 | 85 | .9 | 7.8 | Do. |

EXAMPLE IV

A primer paint composition produced in accordance with Example I was diluted with demineralized water to form a 10 percent solids solution. Five gallons of this 10 percent solids solution was then placed in an electrolytic cell. A steel coil or continuous steel strip was made the anode of the cell. A negative charge was applied to another electrode also immersed in the bath, a difference of potential of 250 volts applied thereto, and coated according to the conventional electrophoretic process. The coil was continuously passed through the bath and the bath solids continuously deposited on the coil as the coil moved through the bath. The speed of the coil through the bath regulated that each portion of the coil would be immersed in the bath for approximately one minute. The paint solids were deposited on the coil forming a film thus causing a gradual depletion of the resin and pigment solids from the bath. As the coating was deposited on the coil, some of the 1,4-bis-(2-hydroxy propyl)-2-methylpiperazine was carried with the resin solids and deposited with the film on to the coil while some of the amine was volatilized and some remained in the bath. About 35 percent of the original amine was lost by being carried and deposited with the resin solids on to the coil anode or lost through evaporation. The other approximately 65 percent amine remained in the bath.

During the continuous electroplating process, additional insolubilized pigmented resin as formed in Example I was added to the bath together with additional 1,4-bis (2 hydroxy propyl)-2-methylpiperazine to make up for the loss of the amine during the operation of the process and to insure solubilization of the unsolubilized pigmented resin being added. The bath was maintained as close as practicable to 10 percent solids and the pH maintained between about 7 and 8 by regulating the amount of amine and pigmented resin added.

For every pound of the unsolubilized pigmented resin added to the bath during the process about 0.05 lb. of 1,4-bis(2-hydroxy propyl)-2-methylpiperazine were also added to the bath to make up for the amine loss which was carried out and deposited with coating or evaporated and to insure solubilization of the unsolubilized pigmented resin being added, and to maintain the desired pH.

The unsolubilized pigmented mix was preheated or premixed to the slurry state at a temperature of 160° F. with 1,4-bis(2-hydroxy propyl)-2-methylpiperazine rich bath, dispersed or solubilized in a colloid mill and then added to the bath. The pH was maintained at between about 7 to 8 and the solids content maintained between about 9 and 12 percent by addition of amine and unsolubilized pigmented resin.

The temperature of the bath was maintained at about 100° F. but ranged from about 90° F. to 115° F.

The resin was thus continuously plated out on the coil and during this continuous plating process, the bath was turned over successfully twenty times. Intermittent tests of electrical properties and the salt spray, water-soak and impact performance of the coatings revealed no detrimental effects due to the continuous electroplating process. The pigmented water-soluble epoxy ester maleic anhydride condensate solubilized with 1,4-bis(2-hydroxy propyl)-2-methyl-piperazine showed good electrical stability and good heat stability along with good electrocoating properties, such as film build, throwing power and current density.

There was very little difference in throwing power, film build, current density, or deposited film properties between the twentieth turnover material and the original zero turnover material. Steel panels were also inserted into the bath about every second turnover having surfaces not directly facing the cathode to test for throwing power as well as film build.

Salt spray tests were run at 0, 6, 12, and 20 turnovers and no degradation in the salt spray resistance was noted in any of the tests run.

The term "Throwing Power" in the above Examples, where the condensate amine salt solutions were used to coat steel panels by the electrophoretic process, is defined as the ability of an electrophoretic coating composition to cover electrode areas that are either shielded or not directly facing the oppositely charged electrode. This ability to coat the recessed areas varies with the degree of shielding. If the degree of shielding is held constant, the throwing power is defined on a percentage basis, that is:

$$\text{Percent Throw} = \frac{\text{Total Shielded Area Coated}}{\text{Total Shielded Area}} \times 100$$

In other words, a throwing power of 70 percent as used in the above examples means that the steel panel anodes are completely coated on the unshielded sides, or the sides facing the cathode, while the opposite or shielded side is only 70 percent coated, the remaining 30 percent of this side of the panel being substantially bare metal.

We claim:
1. The salts of
   (A) 1,4-bis(2-hydroxypropyl)-2-methylpiperazine and
   (B) maleic anhydride condensates of unsaturated fatty acid esters of glycidyl ethers of dihydric phenols wherein
      the condensates (B) contain 5–20 weight percent reacted maleic anhydride based on the total weight of the condensate and wherein
         the unsaturated fatty acid esters are the reaction products of glycidyl ethers of dihydric phenols esterified with unsaturated fatty acids in amounts substantially equivalent to the hydroxyl functionality of the glycidyl ethers.

2. The compositions of claim 1 wherein the glycidyl ethers of dihydric phenols are diglcidyl ethers having molecular weights less than about 700.

3. The compositions of claim 2 wherein the diglycidyl ethers are diglycidyl ethers of bis(4-hydroxyphenyl) dimethyl methane.

4. An aqueous coating composition comprising:
   (A) water and
   (B) salts of
      (a) 1,4-bis(2-hydroxypropyl)-2-methylpiperazine and
      (b) maleic anhydride condensates of unsaturated fatty acid esters of glycidyl ethers of dihydric phenols wherein the condensates (b) contain 5–20 weight percent reacted maleic anhydride based on the total weight of the condensate, wherein
         the unsaturated fatty acid ester are the reaction products of glycidyl ethers of dihydric phenols esterified with unsaturated fatty acids in amounts substantially equivalent to the hydroxyl functionality of the glycidyl ethers, and wherein
      (a) and (b) are in the proportions of 0.5 to 1.5 amine equivalents of (a) to 1 carboxylic acid equivalent of (b).

5. The coating composition of claim 4 wherein the glycidyl ethers of dihydric phenols are diglycidyl ethers having molecular weights less than about 700.

6. The coating composition of claim 5 wherein the diglycidyl ethers are diglycidyl ethers of bis(4-hydroxyphenyl) dimethyl methane.

7. An electrophoretic bath comprising:
   (A) water and
   (B) about 2 to 20 weight percent, based on the total weight of (A) and (B) of salts of
      (a) 1,4-bis(2-hydroxypropyl)-2-methylpiperazine and
      (b) maleic anhydride condensates of unsaturated fatty acid esters of glycidyl ethers of dihydric phenols wherein the condensates (b) contain 5–20 weight percent reacted maleic anhydride based on the total weight of the condensate, wherein
         the unsaturated fatty acid esters are the reaction products of glycidyl ethers of dihydric phenols esterified with unsaturated fatty acids in amounts substantially equivalent to the hydroxyl functionality of the glycidyl ethers, and wherein,
      (a) and (b) are in the proportions of 0.5 to 1.5 amine equivalents of (a) of 1 carboxylic acid equivalent of (b).

8. The electrophoretic bath of claim 7 wherein the glycidyl ethers of dihydric phenols are esters of diglycidyl ethers having molecular weights less than about 700.

9. The electrophoretic bath of claim 8 wherein the diglycidyl ethers are diglycidyl ethers of bis(4-hydroxyphenyl) dimethyl methane.

10. A process for preparing water-soluble epoxide resin esters which comprises:
    (A) reacting a glycidyl ether of a dihydric phenol with an unsaturated fatty acid in sufficient proportions to react with substantially all of the hydroxyl functional groups of the glycidyl ether to form the corresponding fatty acid ester of the glycidyl ether,
    (B) reacting the fatty acid ester with about 5 to 20 weight percent, based on the total weight of maleic anhydride and fatty acid ester, of maleic anhydride to form the maleic anhydride condensate of the fatty acid ester and
    (C) reacting the condensate with 1,4-bis(2-hydroxypropyl)-2-methylpiperazine in sufficient proportions to render the condensate water-soluble.

11. The process of claim 10 wherein the glycidyl ethers of dihydric phenols are diglycidyl ethers having molecular weights less than about 700.

12. The process of claim 11 wherein the diglycidyl ethers are diglycidyl ethers of bis(4-hydroxyphenyl) dimethyl methane.

13. The process which comprises coating a substrate with the composition of claim 6 and curing the coating to the insoluble infusible state.

References Cited

UNITED STATES PATENTS

| | | | |
|---|---|---|---|
| 3,297,557 | 1/1967 | Huggard | 260—18 |
| 3,251,790 | 5/1966 | Christenson et al. | 260—18 |
| 3,230,162 | 1/1966 | Gilchrist | 260—18 |

OTHER REFERENCES

Journal of Organic Chemistry, "Ionization Constants for some Piperazine Derivatives," Keyworth, vol. 24, September 1959, pages 1355–1356.

DONALD E. CZAJA, *Primary Examiner.*

C. W. IVY, *Assistant Examiner.*